455-613 AU 233 EX
FIP8106 OR 3,280,332

EXAMINER
230

Oct. 18, 1966 S. YANDO 3,280,332

FERROELECTRIC AMPLIFIER FOR DRIVING LIGHT EMITTING LOAD 347,300

Filed Feb. 25, 1964

2 Sheets-Sheet 1

INVENTOR.
STEPHEN YANDO

BY R. J. Frank
ATTORNEY.

Oct. 18, 1966 S. YANDO 3,280,332

FERROELECTRIC AMPLIFIER FOR DRIVING LIGHT EMITTING LOAD

Filed Feb. 25, 1964 2 Sheets-Sheet 2

INVENTOR.
STEPHEN YANDO

BY

R. J. Frank
ATTORNEY.

United States Patent Office 3,280,332

Patented Oct. 18, 1966

3,280,332
FERROELECTRIC AMPLIFIER FOR DRIVING LIGHT EMITTING LOAD

Stephen Yando, Huntington, N.Y., assignor to General Telephone and Electronics Laboratories Inc., a corporation of Delaware Filed Feb. 25, 1964, Ser. No. 347,300
6 Claims. (Cl. 250—199)

Figure 1:
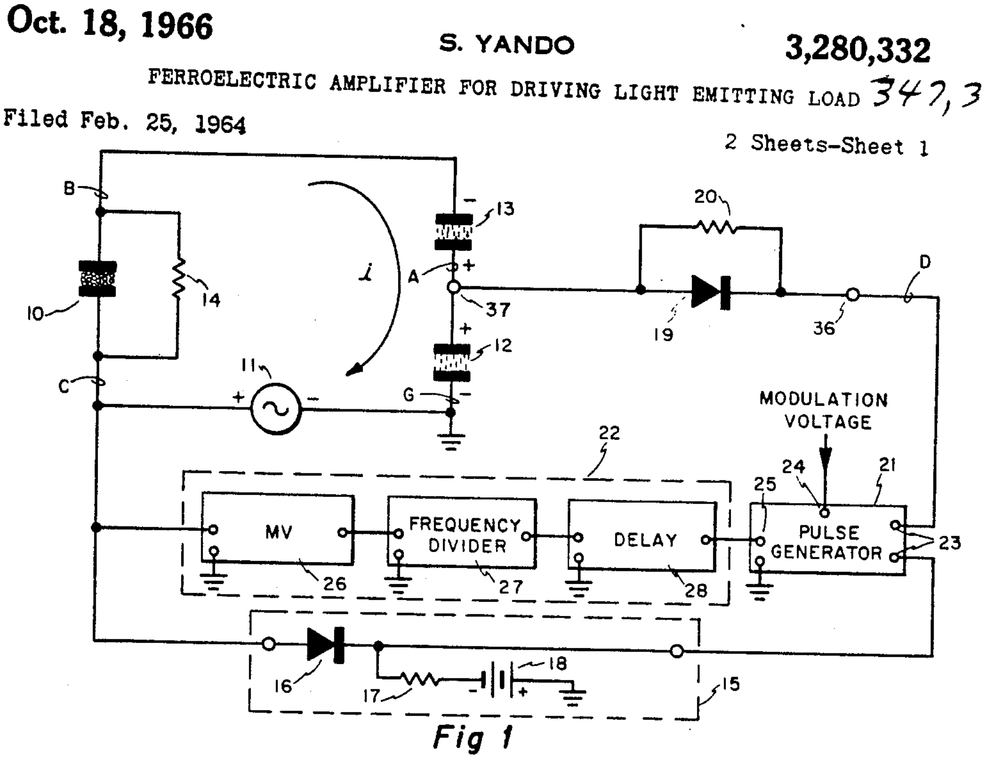

This invention relates to voltage amplifiers employing ferroelectric capacitors and in particular to an amplifier circuit which includes means for storing a voltage having a magnitude corresponding to the magnitude of an applied input signal for a predetermined interval of time after the input signal has been removed.

In electronic systems there are many applications for an amplifier which can receive a short duration input signal, apply a voltage corresponding to that signal across a load element, and maintain the load in an energized state for a predetermined interval of time after the input signal has been removed. For example, in solid state video display devices employing large numbers of electroluminescent light-emitting picture elements, an amplifier of this type may be coupled to each of the picture elements. The video signal is applied sequentially to the input of each amplifier during the frame period thereby sequentially energizing the electroluminescent picture elements. The interval during which the video signal is applied to each amplifier is usually quite short (less than one microsecond) but, due to their storage capabilities, the amplifiers maintain voltage across the elements causing them to emit light for most of the frame period. At the end of the frame period, video pulses are again applied to each amplifier and the brightness of the light emitted by the electroluminescent elements is adjusted to the level of the new signal. By maintaining voltage across the electroluminescent elements during the frame period, the average brightness of the display is greater than if the elements were only momentarily energized and there is substantially less flicker.

In solid state display devices of the type described, the electroluminescent elements are generally excited through variable impedance control elements by an alternating voltage source, the portion of the alternating voltage appearing across each electroluminescent element being determined by the magnitude of the input voltage. In these known circuits, however, the amplitude of the input signal must be substantially equal in magnitude to the peak value of the alternating voltage source to assure that the input signal and not the excitation voltage controls the circuit. Consequently, the voltage and power requirements imposed on the input signal source may be greater than desirable in a given application.

Accordingly, it is an object of my invention to provide an improved control circuit in which the voltage across a load, such as an electroluminescent cell, can be controlled by an input signal having a magnitude which is much lower than the peak value of the voltage exciting the cell.

Another object is to provide a control circuit in which the brightness of the light emitted by an electroluminescent load corresponds to the magnitude of an applied input voltage.

Still another object is to provide a control circuit which is capable of applying a voltage across a load and then maintaining the load in an energized condition for a predetermined interval of time after the input signal has been removed.

In the present invention, an amplifier is provided in which a load element, such as an electroluminescent cell, is connected in series with first and second ferroelectric capacitors and an alternating voltage excitation source.

A ferroelectric capacitor is a device which has a substantially rectangular voltage-charge characteristic such that the capacitor retains a remanent charge when no voltage is applied to its terminals and has zero charge when a voltage, termed the coercive voltage, is impressed across it. The polarity of the charge is dependent upon the polarity of the voltage last applied to the capacitor and is retained as a polarization of the dielectric rather than as a surface charge on the plates of the capacitor.

A first terminal of an asymmetrically conductive switch is connected to the junction of the capacitors and a second terminal of the switch is connected in series with a bias voltage generator and an input signal source. The asymmetrically conductive switch which may, for example, be a diode, is highly conductive for current flowing in one direction but presents a high impedance to current flowing in the opposite direction. The bias voltage generator maintains an instantaneous voltage on the second terminal of the diode having essentially the same waveform as the voltage at the junction between the ferroelectric capacitors but of greater magnitude. The diode is poled so that it normally conducts from its first to its second terminals and therefore is in its high impedance state in the absence of an input signal.

The input signal source is coupled by a synchronizing circuit to the excitation source. The function of the synchronizing circuit is to permit the input signal to be applied to the capacitor junction only during a predetermined portion of the alternating voltage cycle at which maximum control can be obtained with a signal of minimum amplitude.

When no input signal is applied to the circuit, the ferroelectric capacitors are charged by the bias voltage generator until they are in their saturated or high impedance state. As a result, most of the voltage provided by the excitation source appears across the ferroelectric capacitors and the electroluminescent cell is in its unexcited or "off" state. The voltage at the junction of the capacitors has essentially the same waveform as the excitation voltage during one-half of the excitation voltage cycle but during the other half cycle it has a relatively constant value of opposite polarity approximately equal to the coercive voltage of the ferroelectric capacitors. A voltage having this waveform but of slightly greater magnitude, is applied to the second terminal of the diode by the bias voltage generator thereby rendering the diode nonconductive.

Input voltages are applied to the circuit only during the interval in which the voltage at the junction of the ferroelectric capacitors approximates the coercive voltage. The input voltage has the same instantaneous polarity as the voltage at the junction of the capacitors and a magnitude which determines the brightness of the electroluminescent element. Typically, the input voltage is an essentially rectangular pulse having a duration which is short compared to one cycle of the excitation voltage. Application of an input pulse to the circuit renders the diode conductive and the ferroelectric capacitors discharge through the impedance presented by the diode, the bias generator and the input voltage source. Discharging the capacitors reduces the voltage across them and, therefore, a greater fraction of the excitation voltage appears across the electroluminescent cell causing it to emit light. The brightness of the electroluminescent cell is determined by the amount of charge still remaining on the capacitors which, in turn, is a function of the magnitude of the input pulse.

After the input pulse has been removed, the capacitors slowly recharge through the high impedance of the diode returning the electroluminescent cell to its "off" state. The time required to reduce the voltage across the electroluminescent cell to a value below which it will not emit light is made approximately equal to the interval between input pulses by suitable selection of the circuit time constants.

Figure 3A:
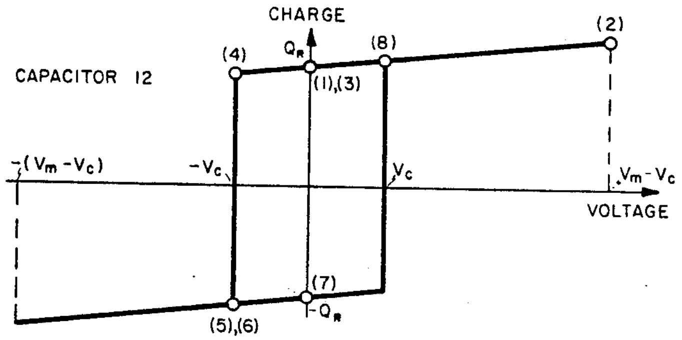
Figure 3B:
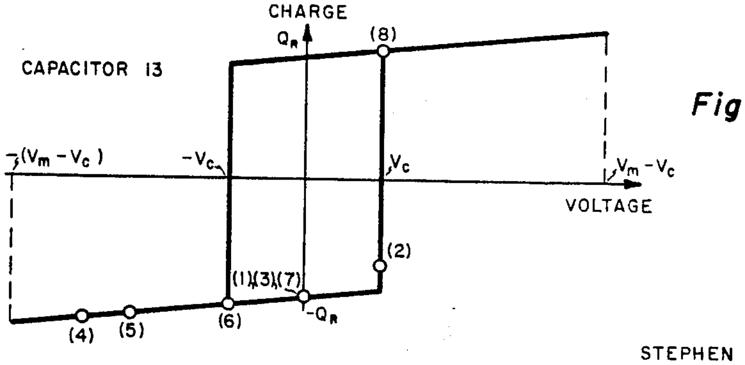

The above objects of and the brief introduction to the present invention will be more fully understood and further objects and advantages will become apparent from a study of the following description in connection with the drawings, wherein:

FIG. 1 is a schematic diagram of my invention,

FIGS. 2*a*–2*e* are idealized illustrations of waveforms existing at various points in the diagram of FIG. 1, and FIGS. 3*a* and 3*b* depict the relationship between charge and voltage for the ferroelectric capacitors shown in FIG. 1.

Referring to FIG. 1, there is shown an electroluminescent cell 10 connected in series with an alternating voltage source 11 and first and second ferroelectric capacitors 12 and 13. A resistor 14 is shunted across electroluminescent cell 10. Ferroelectric capacitors 12 and 13, which employ a material such as barium titanate as a dielectric, exhibit the voltage-charge characteristics shown in idealized form in FIGS. 3*a* and 3*b*. The hysteresis loop of FIG. 3*a*, for example, is a plot of the total charge present in capacitor 12 as a function of the voltage impressed across that capacitor. When a voltage is first applied to such a capacitor, the dielectric material is unpolarized and the charge and voltage variations increase from zero. Thereafter, the charge variations follow the hysteresis loop as the voltage across the capacitor changes. The voltage across the capacitor when the charge is zero is called the coercive voltage $V_c$ and the total charge in the capacitor when the impressed voltage is zero is termed the remanent charge $Q_R$. The remanent charge $Q_R$ may be either positive or negative depending upon the polarity of the impressed voltage.

A bias generator 15, comprising a series-connected diode 16, resistor 17 and direct voltage source 18, is coupled across alternating voltage source 11. An asymmetrically conductive switch, consisting of a diode 19 shunted by a resistor 20, is coupled in series with the output terminals of an input signal source 21 to the junction of diode 16 and resistor 17. A synchronizing circuit 22 is coupled between the junction of electroluminescent cell 10 and voltage source 11 and the input of signal source 21.

Signal source 21 may be a one-shot multivibrator or pulse generator wherein a single negative pulse of fixed duration is generated across output terminals 23 only when voltages are applied simultaneously to both input terminals 24 and 25. The video modulation voltage applied to terminal 24 determines the instantaneous magnitude of the voltage across output terminals 23 and the voltage applied to terminal 25 determines the instant at which the output pulse is generated.

The frequency of alternating voltage source 11 is, in general, much higher than the rate at which pulses are to be generated at the output of signal source 21. Accordingly, the excitation voltage 11 is coupled to a multivibrator 26 which applies a voltage pulse to frequency divider 27 each time the excitation voltage produced by source 11 goes positive. Frequency divider 27 generates pulses at a rate equal to the desired repetition rate of the pulses at the output of generator 21 and these are coupled to delay circuit 28. Delay circuit 28 introduces a fixed time delay of between one-half and one cycle of the period of alternating voltage $V_{CG}$. As a result, negative pulses are generated by source 21 only during the negative half of the excitation source 11 of voltage $V_{CG}$. In a typical application, alternating voltage source 11 may have a frequency of 3000 cycles per second. Divider 27 divides by 100 to produce a train of pulses across terminals 23 during the negative half of the excitation cycle at a rate of 30 per second.

Charging current is supplied to ferroelectric capacitors 12 and 13 by battery 18 through resistor 17 and by the rectified current flowing from excitation source 11 through diode 16. This charging current tends to saturate both capacitors 12 and 13, reducing their capacitance, and increasing their impedance. The total charge on capacitors 12 and 13 at any instant is also determined by the current *i* generated by voltage source 11 which increases the charge on capacitor 12 during the positive half of the cycle (i.e. the direction of current flow indicated by the arrow) and decreases it during the negative half cycle.

Figure 2:
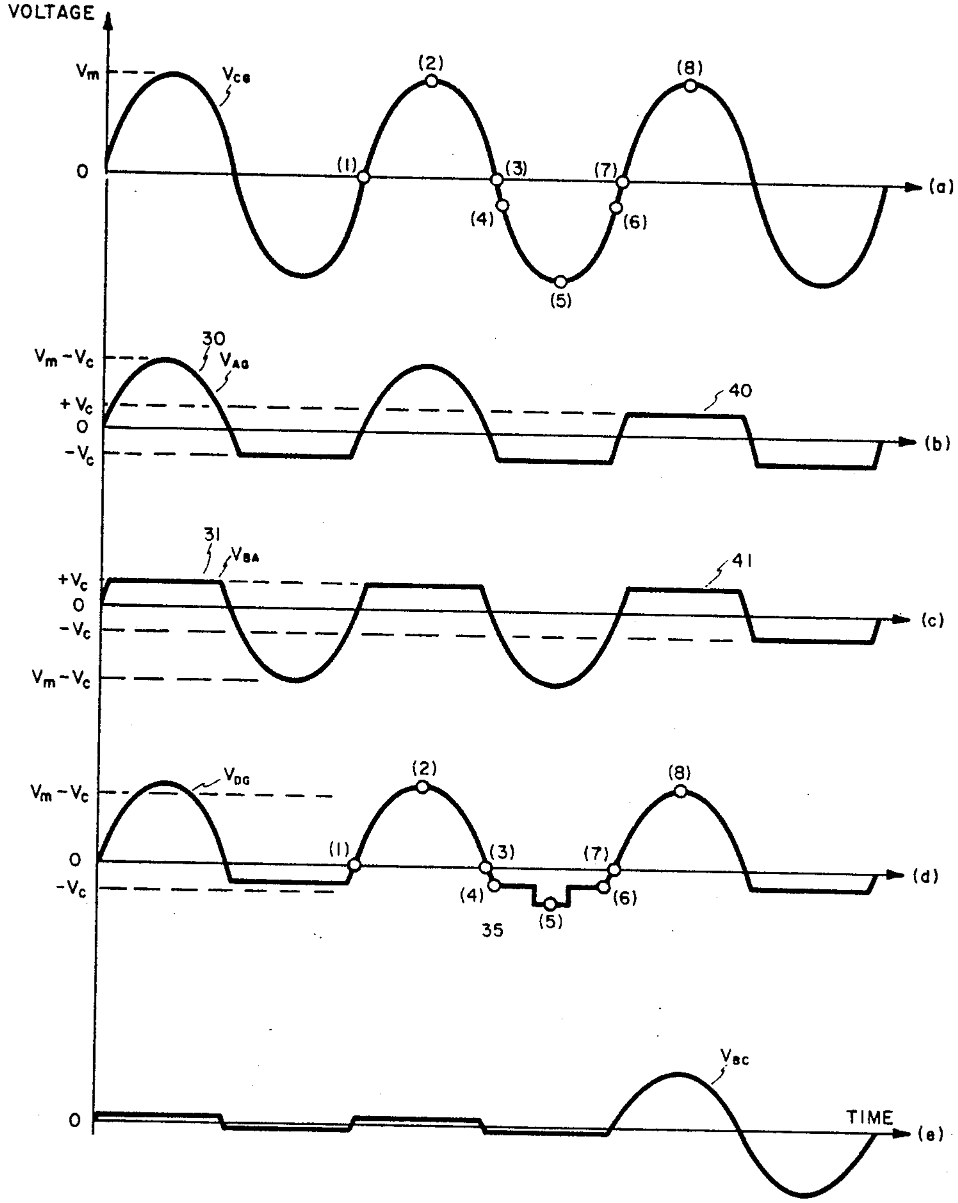

In FIG. 2*a*, the excitation source voltage $V_{CG}$ is represented as having a sinusoidal waveform with an amplitude $V_m$ although voltage sources having other alternating waveforms may be employed. During the positive half of the first cycle shown, the voltage $V_{AG}$ across capacitor 12 increases sinusoidally to a value approximately equal to $V_m - V_c$ whereas the voltage $V_{BA}$ across capacitor 13 increases only to $V_C$ as shown at 30 and 31 respectively. During the negative half of the first cycle, voltage $V_{AG}$ is negative and constant at a value $V_C$ whereas the voltage $V_{BA}$ across capacitor 13 charges sinusoidally to a peak value of approximately $V_m - V_c$. During the positive and negative half cycles respectively, capacitors 12 and 13 have high impedances and therefore there is insufficient voltage across electroluminescent cell 10 to cause it to emit light. Electroluminescent cell 10 may have a high leakage resistance and, in this case, resistor 14 is provided to permit current flow around the cell to charge the capacitors.

In the absence of an input signal from pulse generator 21, diode 19 is maintained in its nonconducting state by a voltage $V_{DG}$ (FIG. 2*d*) having a magnitude slightly greater than that across capacitor 12. Since the voltage across capacitor 12 has essentially the same waveform as a displaced half-wave rectified voltage, voltage $V_{DG}$ is obtained by rectifying the output of source 11 by diode 16 and adding a voltage slightly less than $-V_c$ from battery 18.

When a pulse is applied to input terminal 25 of pulse generator 21 at the same time that modulation voltage is applied to terminal 24, a negative going pulse 35 (FIG. 2*d*) having a magnitude proportional to that of the modulation voltage is produced across terminals 23 of generator 21. This pulse drives the potential of terminal 36 below that of terminal 37 causing diode 19 to conduct heavily. As a result, capacitors 12 and 13 discharge through the low resistance path presented by diode 19 and resistor 17. During the succeeding positive half cycles of voltage source 11, the capacitances of capacitors 12 and 13 are increased thereby lowering their impedances and causing most of the excitation voltage to appear across electroluminescent cell 10 which then lights. The voltages $V_{AG}$ and $V_{BA}$, for the "on" state of electroluminescent cell 10 are shown at 40 and 41 in FIGS. 2*b* and 2*c* respectively. The voltage $V_{BC}$ across electroluminescent cell 10 is illustrated in FIG. 2*e* before and after application of the input pulse 35.

The operation of the current may be more fully understood by considering the voltage-charge relationship in the ferroelectric capacitors 12 and 13 during the positive cycle of excitation source 11 before application of a negative pulse to the circuit, during the half cycle that the pulse is applied and during the succeeding half cycle. In FIGS. 2*a* and 2*d*, a number of instants of time have been designated by numerals corresponding to numerals in FIGS. 3*a* and 3*b* showing the charge and voltage on capacitors 12 and 13 respectively at particular instants of time. At time (1), voltages $V_{CG}$ and $V_{DG}$ are zero and, as shown in FIGS. 3*a* and 3*b*, the charges on capacitors 12 and 13 are equal to their remanent values $+Q_R$ and $-Q_R$ respectively. As the excitation voltage $V_{CG}$ becomes positive, the voltage across capacitor 12 increases to a peak value $V_m - V_c$ while the charge increases only slightly as shown at (2) in FIG. 3*a*. The increased charge on capacitor 12 is transferred from capacitor 13 as shown at (2) in FIG. 3*b*, the voltages shown in FIGS. 3*a* and 3*b* corresponding to these shown in FIGS. 2*b* and 2*c* at time (2). As the excitation voltage becomes less positive, the operating points on FIGS. 3*a* and 3*b* swing back through their remanent values at time (3). At time (4), the voltage across capacitor 12 is equal to $-V_c$ and that across capacitor 13 is between $-V_c$ and $-(V_m-V_c)$. Introduction of the pulse 35 at time (5) discharges capacitors 12 and 13, the charge on capacitor 12 reversing polarity and the charge on capacitor 13 increasing slightly as the operating point moves toward the origin. Electroluminescent cell 10 is not energized at tnis time because the high impedance of capacitor 13 does not permit sufficient voltage to appear across the cell. At times (6), (7) and (8), the operating points of capacitors 12 and 13 are on corresponding portions of the hysteresis loops and at point (8) the voltage across both capacitors is $V_c$. Accordingly, as the excitation voltage $V_{CG}$ goes positive, most of the excitation voltage appears across cell 10 as shown in FIG. 2*e* and the cell emits light.

After pulse 35 has been removed, diode 19 again becomes nonconductive and the capacitors are charged slowly through high resistance 20 until the electroluminescent cell is extinguished. The value of resistor 20 is selected to provide a time constant which allows the electroluminescent cell to remain lit for almost the entire interval between pulses 35.

Typical values for the circuit of FIG. 1 are as follows:

| | |
|---|---|
| Electroluminescent cell **10** | 250 micromicrofarads. |
| Voltage source **11** | 100 volts r.m.s., 3000 cycles/sec. |
| Ferroelectric capacitor **12** | 0.1 microcoulomb polarization charge. |
| Ferroelectric capacitor **13** | 0.1 microcoulomb polarization charge. |
| Resistor **14** | 2 megohms. |
| Diode **16** | Type 1N661. |
| Resistor **17** | 1000 ohms. |
| Battery **18** | 15 volts. |
| Diode **19** | Type 1N485A. |
| Resistor **20** | 50 megohms. |

By synchronizing application of the input pulses so that they are applied only during the half cycle in which the voltage across capacitor 12 is substantially equal to the coercive voltage, pulses having magnitudes in the range 10 to 20 volts and durations on the order of 0.5 microsecond may be used to control the circuit. Light emission has been obtained from the electroluminescent cell in excess of 10 foot lamberts with a pulse repetition rate of 28 pulses per second.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A voltage amplifier for varying the voltage across a load impedance in accordance with the magnitude of the voltage output of a signal source comprising (a) first and second series-connected ferroelectric capacitors, (b) means coupling an alternating voltage source in series with said load impedance and said ferroelectric capacitors, the voltage generated by said alternating voltage source having first and second polarities, (c) asymmetrically conductive switching means having first and second terminals, said first terminal being coupled to the junction of said first and second series-connected ferroelectric capacitors, (d) bias voltage generating means coupled to the second terminal of said switching means, said bias voltage generating means producing a voltage at said second terminal having an instantaneous magnitude exceeding the instantaneous magnitude of the voltage at the junction of said ferroelectric capacitors, and (e) synchronizing means coupled between said alternating voltage source and said signal source, said means synchronizing said signal source with said alternating voltage source to produce an output voltage pulse only when said alternating voltage source has a predetermined polarity.

2. A voltage amplifier for varying the voltage across a load impedance in accordance with the magnitude of the voltage output of a signal source comprising (a) first and second series-connected ferroelectric capacitors, (b) means coupling an alternating voltage source in series with said load impedance and said ferroelectric capacitors, the voltage generated by said alternating voltage source having first and second polarities, (c) asymmetrically conductive switching means having first and second terminals, said first terminal being coupled to the junction of said first and second series-connected ferroelectric capacitors, (d) bias voltage generating means coupled to the second terminal of said switching means, said bias voltage generating means producing a voltage at said second terminal having a magnitude slightly exceeding the difference between the magnitude of said alternating voltage source and the coercive voltage of said ferroelectric capacitors when said alternating voltage source has said first polarity and producing a voltage at said second terminal having a magnitude not greater than the coercive voltage of said ferroelectric capacitors when said alternating voltage source has said second polarity, and (e) synchronizing means coupled between said alternating voltage source and said signal source, said means synchronizing said signal source with said alternating voltage source to produce an output voltage pulse only when said alternating voltage source has said second polarity.

3. A voltage amplifier for varying the voltage across a load impedance in accordance with the magnitude of the voltage output of a signal source comprising (a) first and second series-connected ferroelectric capacitors, (b) means coupling an alternating voltage source in series with said load impedance and said ferroelectric capacitors, the voltage generated by said alternating voltage source having first and second polarities, (c) a first diode having first and second terminals, said first terminal being coupled to the junction of said first and second series-connected ferroelectric capacitors and said second terminal being coupled to one terminal of said signal source, (d) bias voltage generating means comprising a second diode and a direct voltage source coupled in series across said alternating voltage source, the junction between said second diode and said direct voltage source being connected to the other terminal of said signal source, said bias voltage generating means producing a voltage at said second terminal having a magnitude slightly exceeding the difference between the magnitude of said alternating voltage source and the coercive voltage of said ferroelectric capacitors when said alternating voltage source has said first polarity and producing a voltage at said second terminal having a magnitude not greater than the coercive voltage of said ferroelectric capacitors when said alternating voltage source has said second polarity, and (e) synchronizing means coupled between said alternating voltage source and said signal source, said means synchronizing said signal source with said alternating voltage source to produce an output voltage pulse only when said alternating voltage source has said second polarity.

4. A voltage amplifier comprising (a) first and second series-connected ferroelectric capacitors,
(b) a voltage responsive light-emitting element,
(c) means coupling an alternating voltage source in series with said light emitting element and said ferroelectric capacitors, the voltage generated by said alternating voltage source having first and second polarities,
(d) asymmetrically conductive switching means comprising a first diode and a resistor connected in parallel with said first diode,
(e) a signal voltage source,
(f) bias voltage generating means comprising a second diode and a direct voltage source coupled in series across said alternating voltage source, said bias voltage generating means producing a voltage at said second terminal having a magnitude slightly exceeding the difference between the magnitude of said alternating voltage source and the coercive voltage of said ferroelectric capacitors when said alternating voltage source has said first polarity and producing a voltage at said second terminal having a magnitude not greater than the coercive voltage of said ferroelectric capacitors when said alternating voltage source has said second polarity,
(g) means coupling said switching means and said signal voltage source in series between the junction of said ferroelectric capacitors ann the junction between said second diode and said direct voltage source, and
(h) synchronizing means coupled between said alternating voltage source and said signal source, said means synchronizing said signal source with said alternating voltage source to produce an outpput voltage pulse only when said alternating voltage source has said second polarity.

5. A voltage amplifier comprising (a) first and second series-connected ferroelectric capacitors,
(b) an electroluminescent cell and a first resistor connected in parallel,
(c) means coupling an alternating voltage source in series with said electroluminescent cell and said ferroelectric capacitors, the voltage generated by said alternating voltage source having first and second polarities,
(d) a diode having first and second terminals and a second resistor connected in parallel, the first terminal of said first diode being connected to the junction of said first and second series-connected ferroelectric capacitors, said first diode being heavily conductive when said first terminal is at a more positive potential than said second terminal, (e) a signal voltage source having first and second output terminals and first and second input terminals, said first output terminal being connected to the second terminal of said diode,
(f) bias voltage generating means comprising
  (1) a second diode having first and second terminals, the first terminal of said second diode being connected to one terminal of said alternating voltage source, said second diode being heavily conductive when said first terminal is at a more positive potential than said second terminal,
  (2) a third resistor having one terminal connected to the second terminal of said second diode, and
  (3) a direct voltage source connected between the other terminal of said third resistor and the other terminal of said alternating voltage source, the junction of said second diode and said third resistor being coupled to the second output terminal of said signal voltage source, bias voltage generating means producing a voltage at said second terminal having a magnitude slightly exceeding the difference between the magnitude of said alternating voltage source and the coercive voltage of said ferroelectric capacitors when said alternating voltage source has said first polarity and producing a voltage at said second terminal having a magnitude not greater than the coercive voltage of said ferroelectric capacitors when said alternating voltage source has said second polarity, and
(g) synchronizing means coupled between said alternating voltage source and said signal source, said means synchronizing said signal source with said alternating voltage source to produce an output voltage pulse only when said alternating voltage source has said second polarity.

6. The voltage amplifier defined by claim 5 wherein said synchronizing means comprises (a) a multivibrator having its input terminals coupled across said alternating voltage source,
(b) a frequently divider having its input terminals coupled to the output of said multivibrator, and
(c) a delay circuit having its input terminal coupled to the output of said frequently divider, and
(d) means coupling the output of said delay circuit to the first input of said signal voltage source, said signal voltage source producing an output pulse of said second polarity when its first and second input terminals are energized simultaneously, the magnitude of said output pulse being proportional to the magnitude of the voltage applied to said second input terminal.

No references cited.

DAVID G. REDINBAUGH, *Primary Examiner.*

J. W. CALDWELL, *Assistant Examiner.*